United States Patent
Skov et al.

(10) Patent No.: US 9,848,415 B2
(45) Date of Patent: Dec. 19, 2017

(54) DM RD BASED LTE DOWNLINK PHYSICAL LAYER

(75) Inventors: Peter Skov, Beijing (CN); Xiaoyi Wang, Wheeling, IL (US); De Shan Miao, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 9 days.

(21) Appl. No.: 14/131,025

(22) PCT Filed: Jul. 6, 2011

(86) PCT No.: PCT/CN2011/001113
§ 371 (c)(1),
(2), (4) Date: Mar. 14, 2014

(87) PCT Pub. No.: WO2013/003980
PCT Pub. Date: Jan. 10, 2013

(65) Prior Publication Data
US 2014/0192786 A1    Jul. 10, 2014

(51) Int. Cl.
*H04W 72/04*  (2009.01)
*H04W 56/00*  (2009.01)
*H04W 74/08*  (2009.01)
*H04L 5/00*   (2006.01)
*H04L 27/26*  (2006.01)

(52) U.S. Cl.
CPC ..... *H04W 72/042* (2013.01); *H04W 56/0005* (2013.01); *H04W 56/0015* (2013.01); *H04W 74/0833* (2013.01); *H04L 5/0053* (2013.01); *H04L 27/2601* (2013.01)

(58) Field of Classification Search
CPC ........... H04W 74/0833; H04W 72/042; H04W 56/0005; H04W 56/0015; H04L 27/2601; H04L 5/0053
See application file for complete search history.

(56) References Cited

U.S. PATENT DOCUMENTS

2010/0273506 A1 * 10/2010 Stern-Berkowitz ... G01S 5/0009
455/456.1
2011/0170496 A1 * 7/2011 Fong ..................... H04L 5/0053
370/329

(Continued)

FOREIGN PATENT DOCUMENTS

CN    101540633 A    9/2009
CN    101931896 A    12/2010

(Continued)

*Primary Examiner* — Jung-Jen Liu
(74) *Attorney, Agent, or Firm* — Harrington & Smith

(57) ABSTRACT

It is provided an apparatus, including synchronizing means adapted to synchronize with a cell of a cellular communication system based on a synchronization signal and to obtain a cell identification of the cell; receiving means adapted to receive a symbol only on one or more subcarriers and subframes which carry at least one symbol of a physical broadcast channel; first obtaining means adapted to obtain a common demodulation reference symbol based on the cell identification and the received symbol; demodulating means adapted to demodulate a signal received on the physical broadcast channel based on the common demodulation reference symbol; user equipment means adapted to provide a user equipment functionality of the communication system.

18 Claims, 1 Drawing Sheet

(56) References Cited

U.S. PATENT DOCUMENTS

| | | | |
|---|---|---|---|
| 2011/0243023 A1 | 10/2011 | Taoka et al. | |
| 2011/0263286 A1* | 10/2011 | Damnjanovic | H04W 74/008 455/513 |
| 2011/0274031 A1* | 11/2011 | Gaal | H04L 5/0051 370/315 |
| 2012/0033643 A1 | 2/2012 | Noh et al. | |
| 2012/0069802 A1* | 3/2012 | Chen | H04L 5/001 370/329 |
| 2012/0113939 A1* | 5/2012 | Kim | H04W 74/006 370/329 |
| 2012/0122472 A1* | 5/2012 | Krishnamurthy | H04L 5/0053 455/456.1 |
| 2012/0188988 A1* | 7/2012 | Chung | H04J 13/00 370/335 |
| 2013/0010685 A1* | 1/2013 | Kim | H03M 13/271 370/315 |
| 2013/0028180 A1* | 1/2013 | Gao | H04W 74/004 370/328 |
| 2013/0230013 A1* | 9/2013 | Seo | H04L 27/2602 370/329 |
| 2013/0329711 A1* | 12/2013 | Seo | H04J 11/0069 370/336 |

FOREIGN PATENT DOCUMENTS

| | | |
|---|---|---|
| CN | 102036301 A | 4/2011 |
| CN | 102055519 A | 5/2011 |
| CN | 102055707 A | 5/2011 |
| CN | 102088434 A | 6/2011 |
| WO | WO 2010/050295 A1 | 5/2010 |
| WO | WO 2010/053309 A2 | 5/2010 |

\* cited by examiner

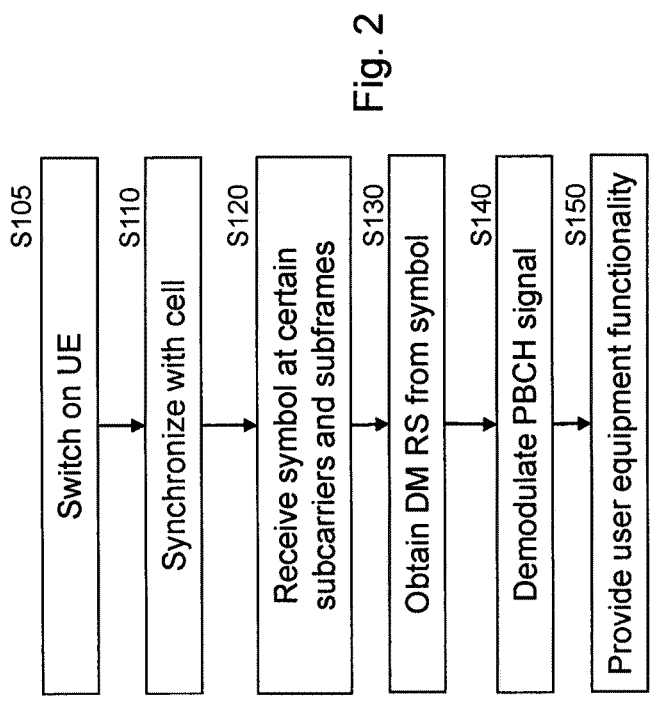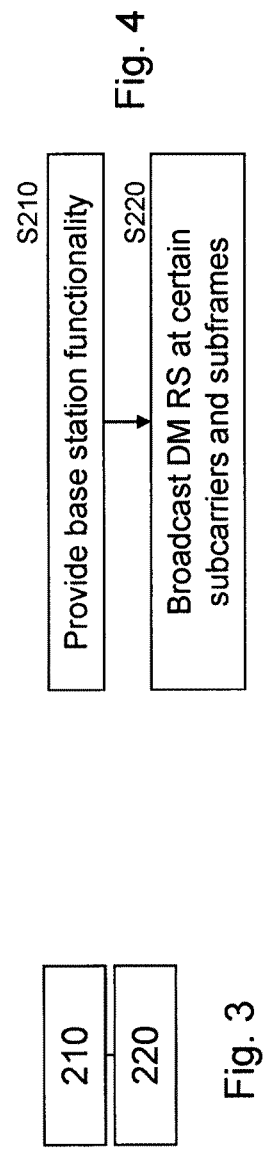

DM RD BASED LTE DOWNLINK PHYSICAL LAYER

FIELD OF THE INVENTION

The present invention relates to an apparatus, a method, a system, and a computer program product related to downlink physical layer. More particularly, the present invention relates to an apparatus, a method, a system, and a computer program product to avoid usage of common reference signals on the LTE downlink physical layer.

BACKGROUND OF THE INVENTION

Abbreviations:
3GPP 3$^{rd}$ generation partnership project
LTE long term evolution
LTE-A LTE-advanced
Rel Release
PDCCH Physical Downlink Control Channel
PHICH Physical HARQ Indicator Channel
PCFICH Physical Control Format Indicator Channel
CoMP Coordinated Multi-Point Transmission
CRS Common Reference Symbols
CSI-RS Channel State Information Reference Symbols
DCI Downlink Control Information
DM RS Demodulation Reference Symbols
DRS Dedicated (UE-Specific) Reference Symbols
eNB, eNodeB Base Station (evolved NodeB)
PDSCH Physical Downlink Shared Channel
RRC Radio Resource Control
TM Transmission Mode
TX Transmit(ter)
UE User Equipment
MIB Master Information Block
SIB System Information Block
PRACH Physical Radio Access Channel
PHICH Physical HARQ Indication Channel
PBCH Physical Broadcast Channel
BD Blind Decoding
SS Search Space
SFN Single Frequency Network
RRM Radio Resource Management
RACH Random Access Channel
RSRP Reference symbol received power
RSRQ Reference symbol received quality
PSS Primary synchronization signal
SSS Secondary synchronization signal
BCH Broadcast Channel
id identifier
RNTI Radio Network Temporary Identifier
C-RNTI Cell RNTI
SPS-RNTI Semi-Persistent Scheduling RNTI
CRC Cyclic Redundancy Check
MIMO Multiple Input multiple output
MU-MIMO Multi-user MIMO LTE downlink physical layer have over the past releases been evolving from being 100% based on common reference signals (CRS) towards using more UE specific reference signals such as DM RS.

The common reference signal in LTE downlink has two main functions: 1) support UE demodulation of data and control messages, 2) support UE measurements used in RRM functions such as MIMO and Handover. It is now a clear trend to gradually reduce the usage of CRS to remove it totally in the future. 3GPP have already considered a number of new functions which can substitute partly the CRS.

By introducing DM RS and CSI-RS, PDSCH transmission doesn't rely on CRS for demodulation and channel measurement any more.

UE Measurements

For the UE measurement function, 3GPP have already in Rel-10 introduced channel state information reference signals (CSI-RS) which allows the UE to do measurements with only limited impact to the system control overhead. Measurement accuracy and reference signal density is clearly related but with current CSI-RS a number of different options are available, so RS density can be adjusted to the radio environment, such that in challenging radio environments higher density is provided.

At Rel-10, it is not possible to use CSI-RS for handover function and RSRP/RSRQ measurement; however there does not seem to be a technical problem which hinders this to be specified at a later stage. In this way all UE measurements may be done based on CSI-RS.

Data Demodulation

For data demodulation DRS (Rel-8) and DM-RS (Rel-9 and -10) was introduced. At the current stage all basic transmissions schemes can be supported with DM RS and only due to legacy UEs, CRS is still needed for data demodulation.

Scrambling and Decoding—PDCCH

For demodulation of downlink control channels such as PDCCH, the Rel-10 relay specification provides a solution (Relay-PDCCH: R-PDCCH) where the PDCCH is demodulated based on DM RS.

For scrambling of PDCCH, Rel-8 has defined that CRC parity bits of PDCCH can be scrambled by RNTI information bits. The entire PDCCH payload is used to calculate the CRC parity bits. Different types of PDCCH are associated with different RNTI. When UE decodes the PDCCH, corresponding RNTI is used to descramble PDCCH.

The control channels PHICH and PCFICH are not strictly needed if CRS is disabled. PHICH functions can already today be handled by PDCCH and as PDCCH would be embedded in the PDSCH region (like R-PDCCH) then there is no need to signal dynamically the control region size, so there is no need for PCFICH.

DMRS Sequence ID Initialization

In LTE R8, the sequence ID of DMRS port 5 shall be initialized with $c_{init}=(\lfloor n_s/2 \rfloor+1) \cdot (2N_{ID}^{cell}+1) \cdot 2^{16}+n_{RNTI}$ at the start of each subframe, where $n_{RNTI}$ is corresponding to PDCCH RNTI in PDSCH transmission and $n_s$ is slot number within a radio frame. $N_{ID}^{Cell}$ is physical cell identity. For DMRS port 5, $N_{ID}^{Cell}$ is cell-specific parameter, $n_{RNTI}$ is UE-specific parameter.

In LTE R9/R10, the sequence ID of DMRS port 7-14 shall be initialised with $c_{init}=(\lfloor n_s/2 \rfloor+1) \cdot (2N_{ID}^{cell}+1) \cdot 2^{16}+n_{SCID}$ at the start of each subframe, where for DMRS antenna ports 7 and 8, $n^{SCID}$ is 1 bit information, given by the scrambling identity field according to the most recent PDCCH DCI format 2B or 2C associated with the PDSCH transmission. $n_{SCID}$ shall be utilized to distinguish different users in MU-MIMO transmission. If there is no DCI format 2B or 2C associated with the PDSCH transmission on DMRS antenna ports 7 or 8, the UE shall assume that $n_{SCID}$ is zero. For DMRS antenna ports 9 to 14, the UE shall assume that $n_{SCID}$ is zero. $N_{ID}^{Cell}$ is physical cell identity.

Random Access Procedure

When UE wants to access the cellular network, a certain preamble code is transmitted. In the coming predefined subframe, UE will try to decode its random access response. RA-RNTI is used to scramble the PDCCH of this response. RA-RNTI is determined by the transmitted PRACH resource. Hereinafter, the first response is denoted as message 2. Message 2 will carry a temporary RNTI for next message decoding. After message 2 reception, UE will transmit a response message to the eNB for RRC connect request. After eNB reception of this message, eNB will send a message 4 as the confirmation to complete random access procedure. UE decodes the PDCCH of message 4 using temp RNTI descrambling. Herein message 2 and message 4 both are carried by PDSCH. In Rel 8/Rel 9/Rel 10, the demodulation of PDCCH and PDSCH is based on CRS.

Paging Message Demodulation

Paging message is initiated by network to recall a certain user. PDCCH of paging message is scrambled by Paging-RNTI (P-RNTI). P-RNTI is configured by eNB with RRC message before paging. UE will wait and blindly decode its paging PDCCH in predetermined subframe. If decoding is successful, the paging message will be captured by the UE.

DM RS and PDCCH Chicken Egg Problem

One problem already discussed in prior art is how to insure that the UE knows all relevant information needed for demodulating PDCCH. In the Rel-9 DM RS solution some parameters for DM RS initialization are signaled in PDCCH. Thus, they would not be available for demodulating PDCCH. This "chicken-egg" problem was solved for R-PDCCH in a simple way by just stating in the specification static values for these parameters. The drawback of this is that flexibility is very limited, which might be OK for the particular scenario of relay backhaul but for general situation may be not good enough.

SSS/PSS

The synchronization signals are in principle independent of CRS and need no change to operate in CRS less mode.

SUMMARY OF THE INVENTION

It is an object of the present invention to improve the prior art.

According to a first aspect of the invention, there is provided an apparatus, comprising synchronizing means adapted to synchronize with a cell of a cellular communication system based on a synchronization signal and to obtain a cell identification of the cell; receiving means adapted to receive a symbol only on one or more subcarriers and subframes which carry at least one symbol of a physical broadcast channel; first obtaining means adapted to obtain a common demodulation reference symbol based on the cell identification and the received symbol; demodulating means adapted to demodulate a signal received on the physical broadcast channel based on the common demodulation reference symbol; user equipment means adapted to provide a user equipment functionality of the communication system.

The apparatus may further comprise decoding means adapted to blindly decode the demodulated signal of the physical broadcast channel.

In the apparatus, the demodulating means may be further adapted to demodulate a signal received on a physical downlink control channel based on the common demodulation reference symbol.

The apparatus may further comprise second obtaining means adapted to obtain a specific demodulation reference symbol based on a specific identification received from the cell, wherein the demodulating means may be further adapted to demodulate a signal received on a physical downlink control channel based on the specific demodulation reference symbol.

In the apparatus, the demodulating means may be adapted to demodulate a signal received on a physical downlink shared channel allocated in a subframe together with the physical downlink control channel based on the specific demodulation reference symbol.

The apparatus may further comprise RACH response detecting means adapted to detect a random access channel response signal received on a physical downlink shared channel; the demodulating means may be further adapted to demodulate the physical downlink shared channel and a physical downlink control channel based on the common demodulation reference symbol to obtain a demodulated RACH response signal.

The apparatus may further comprise preamble providing means adapted to provide a preamble including a PRACH resource index; RACH response detecting means adapted to detect a random access channel response signal received on a physical downlink shared channel; third obtaining means adapted to obtain a specific RACH demodulation reference symbol based on the PRACH resource index; wherein the demodulating means may be further adapted to demodulate the physical downlink shared channel and a physical downlink control channel based on the specific RACH demodulation reference symbol.

According to a second aspect of the invention, there is provided an apparatus, comprising synchronizing processor adapted to synchronize with a cell of a cellular communication system based on a synchronization signal and to obtain a cell identification of the cell; receiving processor adapted to receive a symbol only on one or more subcarriers and subframes which carry at least one symbol of a physical broadcast channel; first obtaining processor adapted to obtain a common demodulation reference symbol based on the cell identification and the received symbol; demodulating processor adapted to demodulate a signal received on the physical broadcast channel based on the common demodulation reference symbol; user equipment processor adapted to provide a user equipment functionality of the communication system.

The apparatus may further comprise decoding processor adapted to blindly decode the demodulated signal of the physical broadcast channel.

In the apparatus, the demodulating processor may be further adapted to demodulate a signal received on a physical downlink control channel based on the common demodulation reference symbol.

The apparatus may further comprise second obtaining processor adapted to obtain a specific demodulation reference symbol based on a specific identification received from the cell, wherein the demodulating processor may be further adapted to demodulate a signal received on a physical downlink control channel based on the specific demodulation reference symbol.

In the apparatus, the demodulating processor may be adapted to demodulate a signal received on a physical downlink shared channel allocated in a subframe together with the physical downlink control channel based on the specific demodulation reference symbol.

The apparatus may further comprise RACH response detecting processor adapted to detect a random access channel response signal received on a physical downlink shared channel; the demodulating processor may be further adapted to demodulate the physical downlink shared channel and a physical downlink control channel based on the common demodulation reference symbol to obtain a demodulated RACH response signal.

The apparatus may further comprise preamble providing processor adapted to provide a preamble including a PRACH resource index; RACH response detecting processor adapted to detect a random access channel response signal received on a physical downlink shared channel; third obtaining processor adapted to obtain a specific RACH demodulation reference symbol based on the PRACH resource index; wherein the demodulating processor may be further adapted to demodulate the physical downlink shared channel and a physical downlink control channel based on the specific RACH demodulation reference symbol.

According to a third aspect of the invention, there is provided a user equipment comprising an apparatus according to the first or second aspect.

According to a fourth aspect of the invention, there is provided an apparatus, comprising base station means adapted to provide a base station functionality in a cell of a cellular communication system; broadcasting means adapted to broadcast a common demodulation reference signal to all user equipments in the cell, wherein the common demodulation reference signal is based on a cell identification of the cell, and the common demodulation reference symbol is transmitted only on one or more subcarriers and in subframes which carry at least one symbol of a physical broadcast channel.

The apparatus may further comprise physical downlink control channel modulating means adapted to modulate a symbol of a physical downlink control channel to one of the user equipments based on the common demodulation reference symbol.

The apparatus may further comprise specific demodulation reference symbol providing means adapted to provide a specific demodulation reference symbol based on an identification specification specific for one of the user equipments, and physical downlink control channel modulating means adapted to modulate a symbol of a physical downlink control channel to the one of the user equipments based on the specific demodulation reference symbol.

The apparatus may further comprise physical downlink shared channel modulating means adapted to modulate a physical downlink shared channel to the one of the user equipments based on the specific demodulation reference symbol, wherein the physical downlink shared channel may be allocated in a subframe together with the physical downlink control channel to the one of the user equipments.

The apparatus may further comprise RACH response providing means adapted to provide a RACH response message in response to a received preamble, wherein the RACH response message may be provided in a physical downlink shared channel allocated with a physical downlink control channel and modulated based on the common demodulation reference symbol.

The apparatus may further comprise obtaining means adapted to obtain a RACH demodulation reference symbol based on a PRACH resource index comprised in a preamble received from one of the user equipments; RACH response providing means adapted to provide a RACH response message in response to the preamble; and modulating means adapted to modulate the physical downlink shared channel to the one of the user equipments based on the RACH demodulation reference symbol, wherein the physical downlink shared channel may comprise the RACH response message.

According to a fifth aspect of the invention, there is provided an apparatus, comprising base station processor adapted to provide a base station functionality in a cell of a cellular communication system; broadcasting processor adapted to broadcast a common demodulation reference signal to all user equipments in the cell, wherein the common demodulation reference signal is based on a cell identification of the cell, and the common demodulation reference symbol is transmitted only on one or more subcarriers and in subframes which carry at least one symbol of a physical broadcast channel.

The apparatus may further comprise physical downlink control channel modulating processor adapted to modulate a symbol of a physical downlink control channel to one of the user equipments based on the common demodulation reference symbol.

The apparatus may further comprise specific demodulation reference symbol providing processor adapted to provide a specific demodulation reference symbol based on an identification specification specific for one of the user equipments, and physical downlink control channel modulating processor adapted to modulate a symbol of a physical downlink control channel to the one of the user equipments based on the specific demodulation reference symbol.

The apparatus may further comprise physical downlink shared channel modulating processor adapted to modulate a physical downlink shared channel to the one of the user equipments based on the specific demodulation reference symbol, wherein the physical downlink shared channel may be allocated in a subframe together with the physical downlink control channel to the one of the user equipments.

The apparatus may further comprise RACH response providing processor adapted to provide a RACH response message in response to a received preamble, wherein the RACH response message may be provided in a physical downlink shared channel allocated with a physical downlink control channel and modulated based on the common demodulation reference symbol.

The apparatus may further comprise obtaining processor adapted to obtain a RACH demodulation reference symbol based on a PRACH resource index comprised in a preamble received from one of the user equipments; RACH response providing processor adapted to provide a RACH response message in response to the preamble; and modulating processor adapted to modulate the physical downlink shared channel to the one of the user equipments based on the RACH demodulation reference symbol, wherein the physical downlink shared channel may comprise the RACH response message.

According to a sixth aspect of the invention, there is provided a base station comprising an apparatus according to the fourth or fifth aspect.

According to a seventh aspect of the invention, there is provided a system, comprising a user equipment apparatus according to any of the first and second aspects; and a base station apparatus according to any of the fourth and fifth aspects; wherein one of the user equipments in the cell of the base station apparatus may comprise the user equipment apparatus; the cell of the user equipment apparatus may comprise the cell of the base station apparatus; and the common demodulation reference signal received by the user equipment apparatus may comprise the common demodulation reference signal provided by the base station apparatus.

According to an eighth aspect of the invention, there is provided a method, comprising synchronizing with a cell of a cellular communication system based on a synchronization signal to obtain a cell identification of the cell; receiving a symbol only on one or more subcarriers and subframes which carry at least one symbol of a physical broadcast channel; obtaining a common demodulation reference symbol based on the cell identification and the received symbol; demodulating a signal received on the physical broadcast channel based on the common demodulation reference symbol; providing a user equipment functionality of the communication system.

The method may be a method of a user equipment.

The method may further comprise blindly decoding the demodulated signal of the physical broadcast channel.

The method may further comprise demodulating a signal received on a physical downlink control channel based on the common demodulation reference symbol.

The method may further comprise obtaining a specific demodulation reference symbol based on a specific identification received from the cell, and demodulating a signal received on a physical downlink control channel based on the specific demodulation reference symbol.

The method may further comprise demodulating a signal received on a physical downlink shared channel allocated in a subframe together with the physical downlink control channel based on the specific demodulation reference symbol.

The method may further comprise detecting a random access channel response signal received on a physical downlink shared channel; and demodulating the physical downlink shared channel and a physical downlink control channel based on the common demodulation reference symbol to obtain a demodulated RACH response signal.

The method may further comprise providing a preamble including a PRACH resource index; detecting a random access channel response signal received on a physical downlink shared channel; obtaining a specific RACH demodulation reference symbol based on the PRACH resource index; and demodulating the physical downlink shared channel and a physical downlink control channel based on the specific RACH demodulation reference symbol.

According to a ninth aspect of the invention, there is provided a method, comprising providing a base station functionality in a cell of a cellular communication system; broadcasting a common demodulation reference signal to all user equipments in the cell, wherein the common demodulation reference signal is based on a cell identification of the cell, and the common demodulation reference symbol is transmitted only on one or more subcarriers and in subframes which carry at least one symbol of a physical broadcast channel.

The method may be a method of a base station.

The method may further comprise modulating a symbol of a physical downlink control channel to one of the user equipments based on the common demodulation reference symbol.

The method may further comprise providing a specific demodulation reference symbol based on an identification specification specific for one of the user equipments, and modulating a symbol of a physical downlink control channel to the one of the user equipments based on the specific demodulation reference symbol.

The method may further comprise modulating a physical downlink shared channel to the one of the user equipments based on the specific demodulation reference symbol, wherein the physical downlink shared channel is allocated in a subframe together with the physical downlink control channel to the one of the user equipments.

The method may further comprise providing a RACH response message in response to a received preamble, wherein the RACH response message is provided in a physical downlink shared channel allocated with a physical downlink control channel and modulated based on the common demodulation reference symbol.

The method may further comprise obtaining a RACH demodulation reference symbol based on a PRACH resource index comprised in a preamble received from one of the user equipments; providing a RACH response message in response to the preamble; and modulating the physical downlink shared channel to the one of the user equipments based on the RACH demodulation reference symbol, wherein the physical downlink shared channel may comprise the RACH response message.

According to the tenth aspect of the invention, there is provided a computer program product including a program comprising software code portions being arranged, when run on a processor of an apparatus, to perform the method according to any one of the eighth and ninth aspects.

The computer program product may comprise a computer-readable medium on which the software code portions are stored, and/or wherein the program is directly loadable into a memory of the processor.

According to embodiments of the invention, a solution to some key problems related to LTE operation without common reference signals is provided. In detail, a full solution of non-CRS based RACH/paging procedure is disclosed.

The following particular advantages may be achieved solely or in combination according to some of the embodiments:

1. Physical layer operation without CRS allowed;
2. CRS overhead is removed;
3. Allow for spatial multiplexing and precoding of paging and RACH response messages because UE specific DM RS based demodulation is supported;
4. Allow for flexible user resource allocation;
5. More efficient exploitation of radio resources because unnecessary broadcasting of system information may be avoided.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein FIG. 1 shows an apparatus according to an embodiment of the invention;

FIG. 2 shows a method according to an embodiment of the invention;

FIG. 3 shows an apparatus according to an embodiment of the invention; and

FIG. 4 shows a method according to an embodiment of the invention.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

With release 10 of the LTE specification, the benefits of DM RS based transmission are not fully achieved because the system still relies on cell specific reference signals for a number of functions. This leads to increased control overhead in the system and suboptimal performance.

In particular, the PBCH and paging channel are still based on CRS, that makes the RACH mechanism not compatible with a CRS-less network, i.e. a network without CRS. In the following, embodiments providing a non-CRS based RACH/paging procedure are disclosed.

According to embodiments of the invention, UE cell search and system access is supported in case common reference signal is not available.

Cell Search Procedure

1. When UE is powered on, it firstly synchronizes based on PSS/SSS to obtain the cell id.
2. Based on the cell id, the UE derives the DM RS sequence for one or more options of PBCH location. This DM RS sequence is common for all UEs in the cell but different from a cell specific reference signal according to an LTE Rel-8/Rel-9/Rel-10 system due to the following
   a) The DM RS only occupies subcarriers which carry PBCH symbols.
   b) The DM RS is not transmitted in subframes where there is no need for PBCH demodulation, that is, it is transmitted in subframes only carrying at least one PBCH symbol.
   c) Different locations and sizes of DM RS+PBCH may be supported by blind decoding.
3. Once PBCH is successfully decoded, UE knows the basic system information, e.g. system bandwidth, RACH location etc.
4. For decoding further common system information (transmitted on PDSCH) the UE would need to follow PDCCH based indications. There may be two options:
   a) UE may continue to use the common cell specific DMRS sequence for demodulating PDCCH in similar fashion as the PBCH. In this case, PDCCH may be transmitted in a new format where the PDCCH resource elements are localized around the DM RS and related PDSCH carrying the BCH data.
   b) The BCH may be delivered to the UE using point to point transmission. In detail, the PDCCH and PDSCH is transmitted in a similar fashion as according to a) but now using a UE specific DM RS sequence and potentially also UE specific precoding. Thus, the data is not demodulated by any other UE. This is only possible if the UE has completed an access procedure so that the UE has been assigned a UE specific id that can be used as input to DM RS sequence. Examples of ids uniquely identifying the UE may be C-RNTI or SPS-RNTI.

Note that point to point transmission of system information could be more efficient than broadcasting as the information is only transmitted when it is really needed. For traditional broadcast transmission employed today in LTE, the system information is transmitted periodically whether needed or not leading to unnecessary waste of resources especially in the case where there a few users.

It is noted that DMRS sequence ID may be cell-specific or UE-specific, which means the DMRS sequence Id initialization can follow similar principles as of LTE Rel-8/Rel-9/Rel-10 system, but cell-specific and UE-specific parameter may be not identical. Exactly, at least one parameter in the DMRS sequence ID initialization of proposed new DMRS owns UE-specific or cell-specific characteristic.

Access Procedure—Paging

In case of an incoming call to a UE expected to be in the cell but not connected, paging is used. A paging message may be transmitted to the UE.

The paging message may be transmitted on PDSCH which is allocated with a PDCCH. PDCCH and PDSCH are both demodulated based on the common cell specific DM RS sequence (correspondingly to the method according to section 4.a) hereinabove).

Note that, as paging is transmitted to wake up a UE without connection, paging message does not benefit from UE specific precoding and it does not bring benefit to allow that.

Successful paging will trigger start of random access part of the access procedure, see next section.

Access Procedure—RACH

If the UE would like to access the cell, either autonomously or after being paged, it may select a RACH channel and transmit the preamble. The base station may reply to the preamble via PDCCH and PDSCH. There are different options:
   a) The RACH response message may be transmitted on PDSCH which is allocated with a PDCCH. PDCCH and PDSCH are both demodulated based on the common cell specific DM RS sequence (correspondingly to the method according to section 4.a) hereinabove).
   b) The RACH response message may be transmitted on PDSCH which is allocated with a PDCCH. PDCCH and PDSCH are both demodulated based on a UE specific DM RS sequence where a RACH id is used as one of the inputs to initialize the sequence. The RACH id is generated from the parameters of RACH preamble chosen by the UE.
   c) Once RACH response is successfully decoded in the UE, the UE will reply back to the base station in message 3. For message 4 the temporary RNTI (assigned to the UE in message 2) may be used to initialize UE specific DM RS and after that message is received successfully in the UE, Rel-8/Rel-9/Rel-10 procedure for DM RS handling may be used.

One example of RACH id (RAID) derived from PRACH resource index is as follows:

$$RAID=1+t\_id+10*f\_id+PI(CS)$$

Where t_id is the index of the first subframe of the specified PRACH ($0 \le t\_id < 10$), f_id is the index of the specified PRACH within that subframe, in ascending order of frequency domain ($0 \le f\_f < 6$) and PI(CS) is the preamble index which can be generated from the cyclic shift used to generate the preamble sequence. That is, in this example, PI(CS) has the role of a PRACH resource index. With this procedure a UE specific id can be derived and commonly agreed in both base station and UE.

By using a UE specific DM RS sequence, a higher order reuse in case more transmission points are deployed within one cell may be achieved.

FIG. 1 shows an apparatus according to an embodiment of the invention. The apparatus may be a user equipment such as a UE. FIG. 2 shows a method according to an embodiment of the invention. The apparatus according to FIG. 1 may perform the method of FIG. 2 but is not limited to this method. The method of FIG. 2 may be performed by the apparatus of FIG. 1 but is not limited to being performed by this apparatus.

The apparatus may comprise a synchronizing means 110, a receiving means 120, an obtaining means 130, a demodulating means 140, and a user equipment means 150.

When the user equipment is powered on (S105), the synchronizing means 110 synchronizes the user equipment with the cell to which the UE belongs, based on a synchronization signal such as PSS and SSS (S110). Thus, a cell id of the cell is obtained.

The receiving means 120 is adapted to receive a symbol only at certain subcarriers and subframes. In detail, it is adapted to receive the symbol only on subcarriers and subframes which carry at least one symbol of a physical broadcast channel (S120).

From the received symbol, the obtaining means 130 may obtain a common demodulation reference symbol, based on the cell identification (S130). The common DM RS may be common for all UEs in the cell.

Based on the common DM RS, the demodulating means 140 demodulates a signal received on the PBCH (S140).

Then, the user equipment means 150 may provide a user equipment functionality (S150).

FIG. 3 shows an apparatus according to an embodiment of the invention. The apparatus may be a base station such as a NodeB or eNodeB. FIG. 4 shows a method according to an embodiment of the invention. The apparatus according to FIG. 3 may perform the method of FIG. 4 but is not limited to this method. The method of FIG. 4 may be performed by the apparatus of FIG. 3 but is not limited to being performed by this apparatus.

The apparatus may comprise a base station means 210, and a broadcasting means 220.

The base station means 210 may provide a base station functionality of the communication system (S210).

The broadcasting means 220 may provide a common demodulation reference signal to all user equipments of a cell, which is based on the cell identification. The common DM RS may be transmitted only on subcarriers and subframes where a symbol of the PBCH is transmitted, too (S220).

Embodiments of the invention are described with respect to a 3GPP Long-term evolution advanced system. However, embodiments of the invention may be employed in other 3GPP releases and other mobile networks such as universal mobile telecommunication system (UMTS), or long term evolution (LTE).

Embodiments of the invention are described with respect to a user equipment. A user equipment may mean any terminal of the respective communication system, such as a mobile phone, a laptop, a personal digital assistant (PDA), a smartphone, a tablet PC etc. Correspondingly, instead of a NodeB, embodiments of the invention may employ any kind of base station of the respective communication system such as an eNodeB, NodeB, base transceiver station (BTS), a relay node etc.

If not otherwise stated or otherwise made clear from the context, the statement that two entities are different means that they are differently addressed in the mobile network. It does not necessarily mean that they are based on different hardware. That is, each of the entities described in the present description may be based on a different hardware, or some or all of the entities may be based on the same hardware.

According to the above description, it should thus be apparent that exemplary embodiments of the present invention provide, for example a base station, or a component thereof, an apparatus embodying the same, a method for controlling and/or operating the same, and computer program(s) controlling and/or operating the same as well as mediums carrying such computer program(s) and forming computer program product(s). Further exemplary embodiments of the present invention provide, for example a user equipment, or a component thereof, an apparatus embodying the same, a method for controlling and/or operating the same, and computer program(s) controlling and/or operating the same as well as mediums carrying such computer program(s) and forming computer program product(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus comprising:
   at least one processor;
   memory storing a program of instructions;
   wherein the memory storing the program of instructions is configured to, with the at least one processor, cause the apparatus to at least:
   in a user equipment operating in a cellular communication system:
   control the user equipment to synchronize with a cell of a cellular communication system based on a synchronization signal and to obtain a cell identification of the cell;
   control the user equipment to receive in the course of a cell search procedure at least one symbol of a physical broadcast channel;
   control the user equipment to obtain a common demodulation reference signal based on the cell; and
   control the user equipment to demodulate a signal received on the physical broadcast channel based on the common demodulation reference signal, wherein the user equipment is configured so as to recognize that each subcarrier or subframe in which the common demodulation reference signal appears will carry, in addition to the common demodulation reference signal, the at least one symbol of the physical broadcast channel, so that the presence of the common demodulation reference signal in the transmission is interpreted as an indication of the presence of the at least one symbol of the physical broadcast channel.

2. The apparatus according to claim 1, wherein the apparatus is further caused to:
   control the user equipment to demodulate a signal received on a physical downlink control channel based on the common demodulation reference signal; or
   control the user equipment to demodulate a signal received on a physical downlink control channel based on a specific demodulation reference signal, wherein demodulating the signal comprises obtaining the specific demodulation reference signal based on a specific identification received from the cell, wherein the specific demodulation reference signal is specific for a user equipment.

3. The apparatus according to claim 2, wherein the apparatus is further caused to control the user equipment to demodulate a signal received on a physical downlink shared channel allocated in a transmission together with the physical downlink control channel based on the specific demodulation reference signal.

4. The apparatus according to claim 1, wherein the apparatus is further caused to:
control the user equipment to detect a random access channel response signal received on a physical downlink shared channel;
control the user equipment to demodulate the physical downlink shared channel and a physical downlink control channel based on the common demodulation reference signal to obtain a demodulated random access channel response signal.

5. The apparatus according to claim 1, wherein the apparatus is further caused to:
control the user equipment to provide a preamble including a physical random access channel resource index;
control the user equipment to detect a random access channel response signal received on a physical downlink shared channel;
control the user equipment to obtain a random access channel demodulation reference signal based on the physical random access channel resource index;
wherein demodulating further comprises demodulating the physical downlink shared channel and a physical downlink control channel based on the random access channel demodulation reference signal.

6. The apparatus according to claim 1, wherein the apparatus is further caused to control the user equipment to derive the common demodulation reference signal for one or more options of physical broadcast channel locations in the transmission.

7. The apparatus according to claim 1, wherein the physical broadcast channel comprises information indicative of the random access channel location.

8. The apparatus according to claim 1, where the apparatus is further caused to control the user equipment to support different locations and sizes of the physical broadcast channel and the common demodulation reference signal by blind decoding.

9. An apparatus comprising:
at least one processor;
memory storing a program of instructions;
wherein the memory storing the program of instructions is configured to, with the at least one processor, cause the apparatus to at least:
in a base station operating in a cell of a cellular communication system, control the base station to broadcast a common demodulation reference signal in a transmission, wherein the common demodulation reference signal is based on a cell identification of the cell, and wherein the base station is further controlled to manage transmission of the common demodulation reference signal such that each subcarrier and subframe in which the common demodulation reference signal appears also carries at least one symbol of a physical broadcast channel, so that the presence of the common demodulation reference signal provides an indication of the presence of the at least one symbol of the physical broadcast channel in the transmission; and wherein the physical broadcast channel comprises basic system information for a cell search procedure.

10. The apparatus according to claim 9, wherein the apparatus is further caused to:
control the base station to provide a specific demodulation reference signal based on an identification specification specific for a user equipment; and
control the base station to modulate a symbol of a physical downlink control channel to the user equipment based on the specific demodulation reference signal.

11. The apparatus according to claim 9, wherein the apparatus is further caused to control the base station to provide a random access channel response message in response to a received preamble, wherein the random access channel response message is provided in a physical downlink shared channel allocated with a physical downlink control channel and modulated based on the common demodulation reference signal.

12. The apparatus according to claim 9, wherein the apparatus is further caused to:
control the base station to obtain a random access channel (RACH) demodulation reference signal based on a physical random access channel resource index comprised in a preamble received from a user equipment;
control the base station to provide a random access channel (RACH) response message in response to the preamble; and
control the base station to modulate the physical downlink shared channel to the user equipment based on the RACH demodulation reference signal, wherein the physical downlink shared channel comprises the RACH response message.

13. A method comprising:
synchronizing with a cell of a cellular communication system based on a synchronization signal to obtain a cell identification of the cell;
receiving in the course of a cell search procedure at least one symbol of a physical broadcast channel;
obtaining a common demodulation reference signal based on the cell identification;
demodulating a signal received on the physical broadcast channel based on the common demodulation reference signal; and
providing a user equipment functionality of the cellular communication system;
wherein providing the user equipment functionality comprises configuring the user equipment so as to recognize that each subcarrier or subframe in which the common demodulation reference signal appears will carry, in addition to the common demodulation reference signal, the at least one symbol of the physical broadcast channel, so that the presence of the common demodulation reference signal in the transmission is interpreted as an indication of the presence of the at least one symbol of the physical broadcast channel.

14. The method according to claim 13, further comprising
demodulating a signal received on a physical downlink control channel based on the common demodulation reference signal; or
demodulating a signal received on a physical downlink control channel based on a specific demodulation reference signal,
wherein the method further comprises obtaining a specific demodulation reference signal based on a specific identification received from the cell, wherein the specific demodulation reference signal is specific for a user equipment.

15. The method according to claim 14, further comprising demodulating a signal received on a physical downlink shared channel allocated in a transmission together with the physical downlink control channel based on the specific demodulation reference signal.

16. The method according to claim 13, further comprising:
   detecting a random access channel response signal received on a physical downlink shared channel; and
   demodulating the physical downlink shared channel and a physical downlink control channel based on the common demodulation reference signal to obtain a demodulated random access channel response signal.

17. A method comprising:
   providing a base station functionality in a cell of a cellular communication system;
   broadcasting a common demodulation reference signal to all user equipments in a transmission, wherein the common demodulation reference signal is based on a cell identification of the cell, and wherein transmission of the common demodulation reference signal is managed such that each subcarrier and subframe in which the common demodulation reference signal appears also carries at least one symbol of a physical broadcast channel, so that the presence of the common demodulation reference signal provides an indication of the presence of the at least one symbol of the physical broadcast channel in the transmission; and
   wherein the physical broadcast channel comprises basic system information for a cell search procedure.

18. A non-transitory computer storing a program of instructions, execution of which by at least one processor configures an apparatus to perform the method according to claim 13.

* * * * *

UNITED STATES PATENT AND TRADEMARK OFFICE
CERTIFICATE OF CORRECTION

| | | |
|---|---|---|
| PATENT NO. | : 9,848,415 B2 | Page 1 of 1 |
| APPLICATION NO. | : 14/131025 | |
| DATED | : December 19, 2017 | |
| INVENTOR(S) | : Skov et al. | |

It is certified that error appears in the above-identified patent and that said Letters Patent is hereby corrected as shown below:

On the Title Page

Item (54) and in the Specification Column 1 Line 1-2 the title "DM RD BASED LTE DOWNLINK PHYSICAL LAYER" should be deleted and --DM RS BASED LTE DOWNLINK PHYSICAL LAYER-- should be inserted.

Signed and Sealed this
Twenty-second Day of May, 2018

Andrei Iancu
*Director of the United States Patent and Trademark Office*